(12) United States Patent
Gallacher et al.

(10) Patent No.: US 11,487,606 B2
(45) Date of Patent: Nov. 1, 2022

(54) AUTOMATED ALERT AUGMENTATION FOR DEPLOYMENTS OF SOFTWARE-DEFINED STORAGE

(71) Applicant: EMC IP Holding Company LLC, Hopkinton, MA (US)

(72) Inventors: Sean R. Gallacher, Moncton (CA); Trevor H. Dawe, Riverview (CA); Eric Young, Alexandria, VA (US); Ian D. Bibby, Murrieta, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 189 days.

(21) Appl. No.: 16/886,982

(22) Filed: May 29, 2020

(65) Prior Publication Data
US 2021/0373991 A1 Dec. 2, 2021

(51) Int. Cl.
*G06F 11/00* (2006.01)
*G06F 11/07* (2006.01)
*G06F 9/54* (2006.01)
*G06F 11/30* (2006.01)
*G06F 11/32* (2006.01)

(52) U.S. Cl.
CPC .......... *G06F 11/0793* (2013.01); *G06F 9/542* (2013.01); *G06F 11/0772* (2013.01); *G06F 11/3034* (2013.01); *G06F 11/3086* (2013.01); *G06F 11/327* (2013.01)

(58) Field of Classification Search
CPC ............. G06F 11/0766; G06F 11/0769; G06F 11/0772; G06F 11/0775; G06F 11/0784; G06F 11/0793; G06F 11/327; G06F 11/3003; G06F 11/3006; G06F 11/302; G06F 11/3034; G06F 11/3065; G06F 11/3082; G06F 11/3086; G06F 9/54; G06F 9/542
See application file for complete search history.

(56) References Cited

U.S. PATENT DOCUMENTS

| | | | |
|---|---|---|---|
| 9,172,734 B2 | 10/2015 | Branam et al. | |
| 9,432,461 B2 | 8/2016 | Branam et al. | |
| 10,171,341 B2 * | 1/2019 | Hildebrand | ......... H04L 41/0823 |
| 10,250,917 B1 | 4/2019 | Nijim et al. | |

(Continued)

*Primary Examiner* — Anthony J Amoroso
(74) *Attorney, Agent, or Firm* — Ryan, Mason & Lewis, LLP

(57) ABSTRACT

Methods, apparatus, and processor-readable storage media for automated alert augmentation for deployments of software-defined storage are provided herein. An example computer-implemented method includes obtaining an alert from at least one software-defined storage device; determining one or more items of additional information pertaining to one or more of the alert and the at least one software-defined storage device; augmenting the alert based at least in part on the one or more determined items of additional information; generating a modified version of the augmented alert by incorporating, into the augmented alert, dependency information pertaining to the at least one software-defined storage device and one or more additional software-defined storage devices; and performing one or more automated actions based at least in part on the modified version of the augmented alert.

19 Claims, 11 Drawing Sheets

(56) References Cited

U.S. PATENT DOCUMENTS

| | | | |
|---|---|---|---|
| 10,552,247 B2* | 2/2020 | Li | H04L 43/08 |
| 10,887,158 B2* | 1/2021 | Arora | H04L 41/069 |
| 10,979,281 B2* | 4/2021 | Arora | H04L 41/0604 |
| 11,099,963 B2* | 8/2021 | Arora | G06F 11/327 |
| 2009/0228823 A1 | 9/2009 | Edwards et al. | |
| 2013/0340656 A1 | 12/2013 | Rainier | |
| 2018/0307545 A1* | 10/2018 | Ganesan | G06F 9/542 |
| 2021/0026750 A1* | 1/2021 | Shukla | G06F 11/366 |

* cited by examiner

AUTOMATED ALERT AUGMENTATION FOR DEPLOYMENTS OF SOFTWARE-DEFINED STORAGE

FIELD

The field relates generally to information processing systems, and more particularly to storage in such systems.

BACKGROUND

Commonly, software-defined storage stacks can be deployed in a layered and/or dependent manner, raising the possibility for issues when such stacks provide alerts in response to problems. Consider, for instance, a deployment of software-defined file share technology performed in such a way that the deployment is configured against an underlying software-defined storage block. In a layered deployment, capabilities such as monitoring and alerting provided by each software-defined storage stack may not provide sufficient context to properly diagnose and/or resolve issues. By way merely of example, assume a scenario wherein the underlying software-defined block storage is unaware of the file share technology that is dependent thereon, and the underlying storage-defined block storage accordingly does not provide context in an alert related to the dependency. Additional problems can arise in situations, for example, wherein such alerts contain a key referring to an affected internal resource, wherein the key is known only by the specific software-defined storage stack in question.

Faced with such problems and challenges, conventional storage management approaches are forced to carry out additional analysis in an attempt to obtain concrete and/or supplementary information about the issue(s) and/or resources impacted before solutions can be determined and/or executed.

SUMMARY

Illustrative embodiments of the disclosure provide techniques for automated alert augmentation for deployments of software-defined storage. An exemplary computer-implemented method includes obtaining an alert from at least one software-defined storage device, determining one or more items of additional information pertaining to one or more of the alert and the at least one software-defined storage device, and augmenting the alert based at least in part on the one or more determined items of additional information. The method also includes generating a modified version of the augmented alert by incorporating, into the augmented alert, dependency information pertaining to the at least one software-defined storage device and one or more additional software-defined storage devices, and performing one or more automated actions based at least in part on the modified version of the augmented alert.

Illustrative embodiments can provide significant advantages relative to conventional storage management approaches. For example, problems associated with uncertainty arising from insufficient context provided in connection with alerts are overcome in one or more embodiments through automatically modifying software-defined storage stack alerts using dependency information and additional storage-related data.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
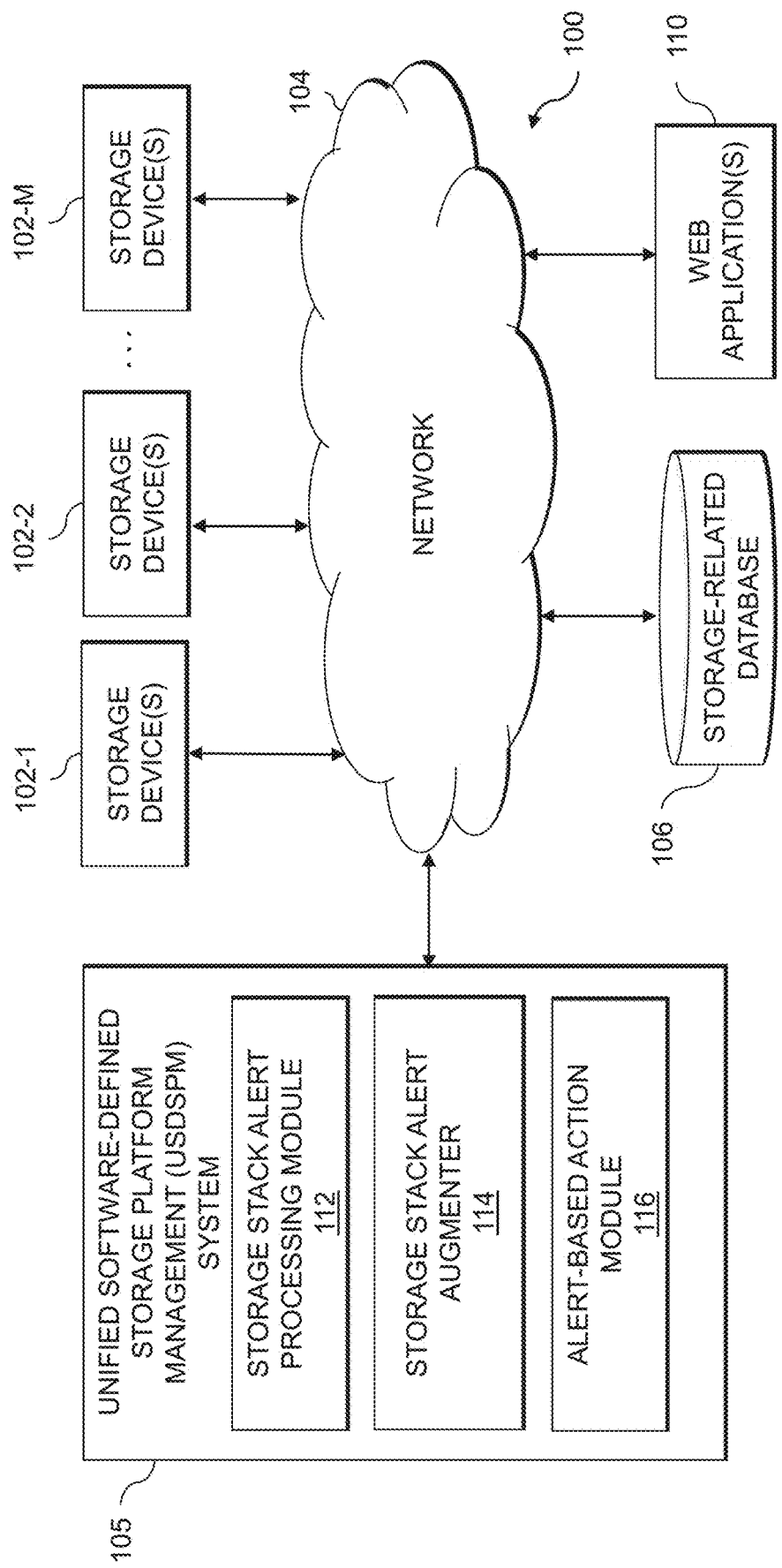
FIG. 1 shows an information processing system configured for automated alert augmentation for deployments of software-defined storage in an illustrative embodiment.

FIG. 1 shows a computer network (also referred to herein as an information processing system) 100 configured in accordance with an illustrative embodiment. The computer network 100 comprises a plurality of storage devices 102-1, 102-2, ... 102-M, collectively referred to herein as storage devices 102. The storage devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is unified software-defined storage platform management (USDSPM) system 105 and one or more web applications 110 (e.g., software-defined storage monitoring and/or management applications).

The storage devices 102 may comprise, for example, software-defined storage stacks. As used herein, a software-defined storage stack refers to software that abstracts data storage resources from an underlying physical storage hardware. In one or more embodiments, the storage devices 102 can also comprise mobile telephones, laptop computers, tablet computers, desktop computers or other types of computing devices. Such devices are examples of what are more generally referred to herein as "processing devices." Some of these processing devices are also generally referred to herein as "computers."

The storage devices 102 in some embodiments comprise respective devices associated with a particular company, organization or other enterprise of one or more users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the USDSPM system 105 can have an associated database 106 configured to store data pertaining to software-defined storage stacks and/or alerts related thereto, which comprise, for example, stack attributes, dependency information, alert attributes, etc.

The database 106 in the present embodiment is implemented using one or more storage systems associated with the USDSPM system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the USDSPM system 105 can be one or more input-output devices, which illustratively comprise keyboards, displays or other types of input-output devices in any combination. Such input-output devices can be used, for example, to support one or more user interfaces to the USDSPM system 105, as well as to support communication between the USDSPM system 105 and other related systems and devices not explicitly shown.

Also, the USDSPM system 105 in the FIG. 1 embodiment is assumed to be implemented using at least one processing device. Each such processing device generally comprises at least one processor and an associated memory, and implements one or more functional modules for controlling certain features of the USDSPM system 105.

More particularly, the USDSPM system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the USDSPM system 105 to communicate over the network 104 with the storage devices 102, and illustratively comprises one or more conventional transceivers.

Also, in one or more embodiments, the USDSPM system 105 can include at least one communication interface that can be called to obtain details about the storage devices under management to assist in augmenting alert data, as further detailed herein.

The USDSPM system 105 further comprises a storage stack alert processing module 112, a storage stack alert augmenter 114, and an alert-based action module 116.

It is to be appreciated that this particular arrangement of modules 112, 114 and 116 illustrated in the USDSPM system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automated alert augmentation for deployments of software-defined storage involving storage devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example USDSPM system 105 in computer network 100 will be described in more detail with reference to the flow diagram of FIG. 9.

Accordingly, at least one embodiment includes automated alert augmentation for deployments of software-defined storage. For example, as further detailed herein, such an embodiment includes defining a mechanism to automatically augment and modify alerts with concrete and/or contextual information pertaining to impacted resources and/or resource dependencies across layered and/or dependent software-defined storage deployments.

As noted herein, software-defined storage stacks commonly provide alerts when problems arise. One or more embodiments include automatically augmenting such alerts with additional information such that administrators and/or resolution systems can better ascertain affected resources and impacts to other resources (e.g., specific volumes, storage pools, other dependent software-defined storage stacks, etc.) related to the issue(s) in question. Using such augmented alerts, administrators and/or resolution systems can better determine remediation actions to be carried out to resolve the issue(s).

Figure 2:
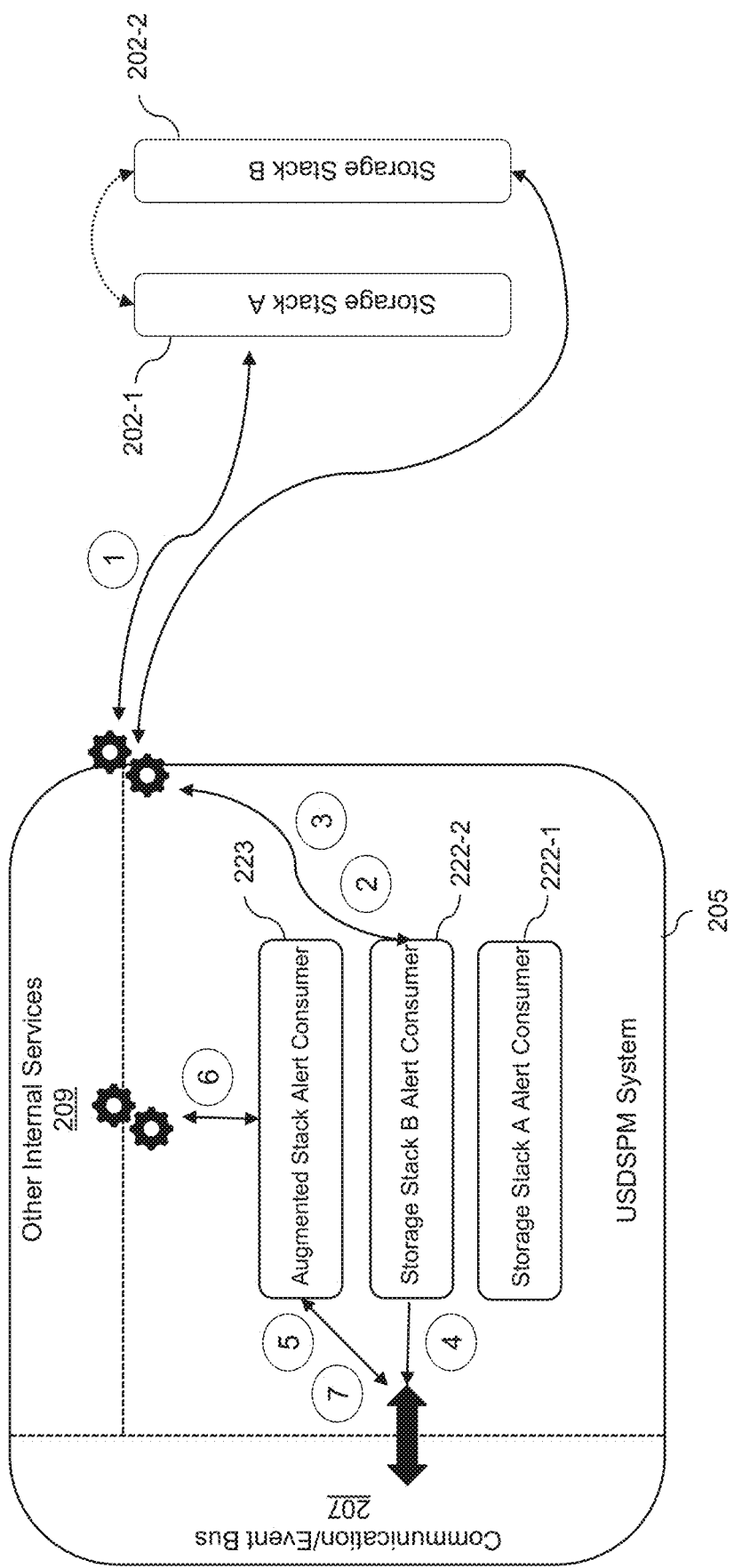
FIG. 2 shows an information processing system configured for automated alert augmentation for deployments of software-defined storage in an illustrative embodiment.

FIG. 2 shows an information processing system configured for automated alert augmentation for deployments of software-defined storage in an illustrative embodiment. By way of illustration, FIG. 2 depicts USDSPM system 205, storage stack A 202-1, and storage stack B 202-2. The USDSPM system 205, as illustrated in this example embodiment, includes a communication and/or event bus 207, one or more internal services 209, storage stack A alert consumer 222-1, storage stack B alert consumer 222-2, and augmented stack alert consumer 223. FIG. 2 also depicts steps 1 through 7, as detailed below.

In step 1, layered software-defined storage stacks (i.e., storage stack A 202-1 and storage stack B 202-2) are deployed. In step 2, storage stack B 202-2 raises an alert which is consumed by the appropriate stack alert consumer 222-2. In step 3, storage stack B alert consumer 222-2 calls out to storage stack B 202-2 to obtain information about the affected resource(s) tied to the alert. In step 4, storage stack B alert consumer 222-2 augments the alert with the additional information obtained from storage stack B 202-2, and storage stack B alert consumer 222-2 publishes the augmented alert using communication and/or event bus 207. In step 5, the augmented stack alert consumer 223 consumes the augmented storage stack alert, and in step 6, the augmented stack alert consumer 223 obtains storage stack dependency information from the USDSPM system 205 (e.g., using one or more internal services 209). Further, in step 7, the augmented stack alert consumer 223 transforms the augmented storage stack alert into a modified (also referred to herein as generic) platform manager alert containing storage stack dependency information, and subsequently publishes the modified platform manager alert using communication and/or event bus 207.

As further detailed below, FIG. 3 through FIG. 8 illustrate an example alert augmentation step sequence utilizing one or more of USDSPM system 305 (which includes database (DB) 306), storage stack A 302-1, and storage stack B 302-2.

Figure 3:
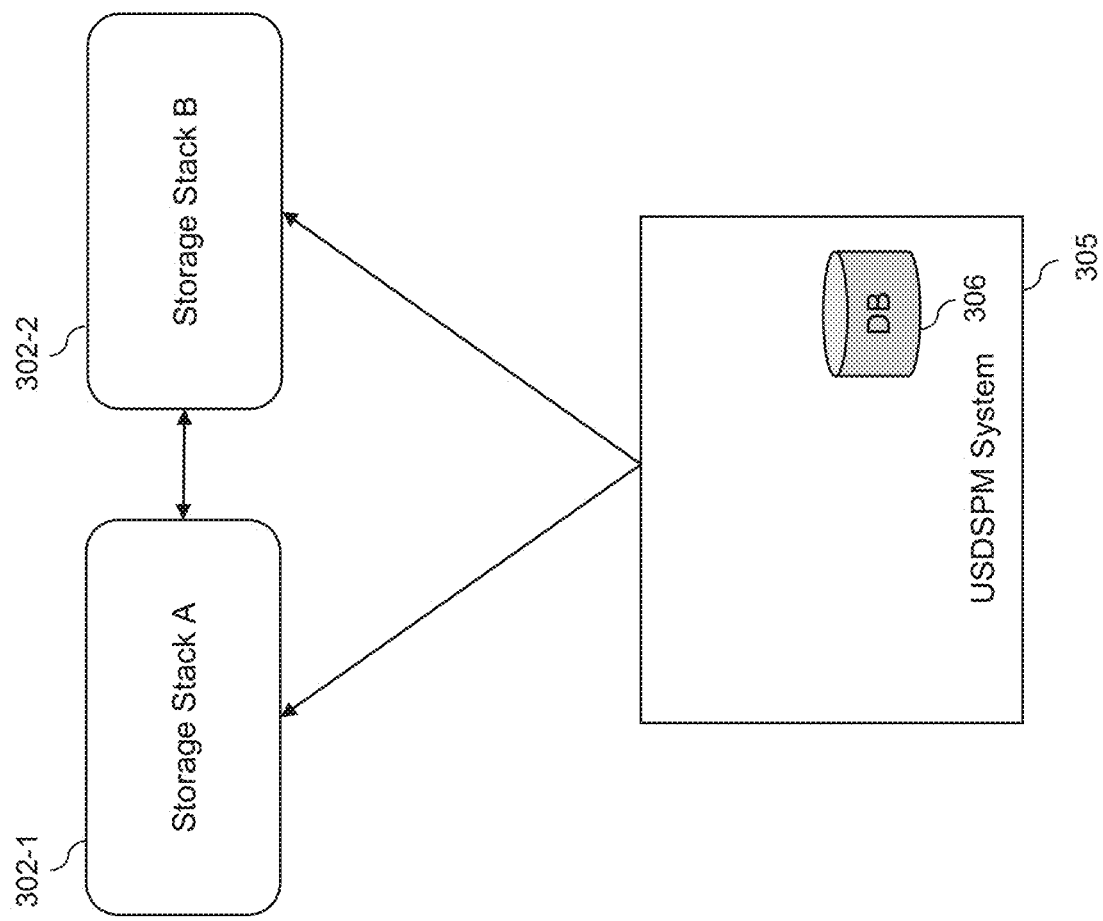
FIG. 3 shows an example layered software-defined storage assessment in an illustrative embodiment.

FIG. 3 shows an example layered software-defined storage assessment in an illustrative embodiment. By way of illustration, FIG. 3 depicts USDSPM system 305 deploying storage stack A 302-1 and storage stack B 302-2, wherein USDSPM system 305 is able to communicate with each stack, and wherein storage stack details are persisted in database 306.

As described herein, in one or more embodiments, a USDSPM system is used to deploy and manage two or more software-defined storage stacks that have at least one dependency on one another. The USDSPM system understands the layering dependencies between such storage stacks and is aware of one or more of the following storage-related aspects: what software-defined storage stacks have been deployed, what dependencies exists between the deployed software-defined storage stacks, how to communicate with the software-defined storage stacks and what credentials to use in such communications.

Figure 4:
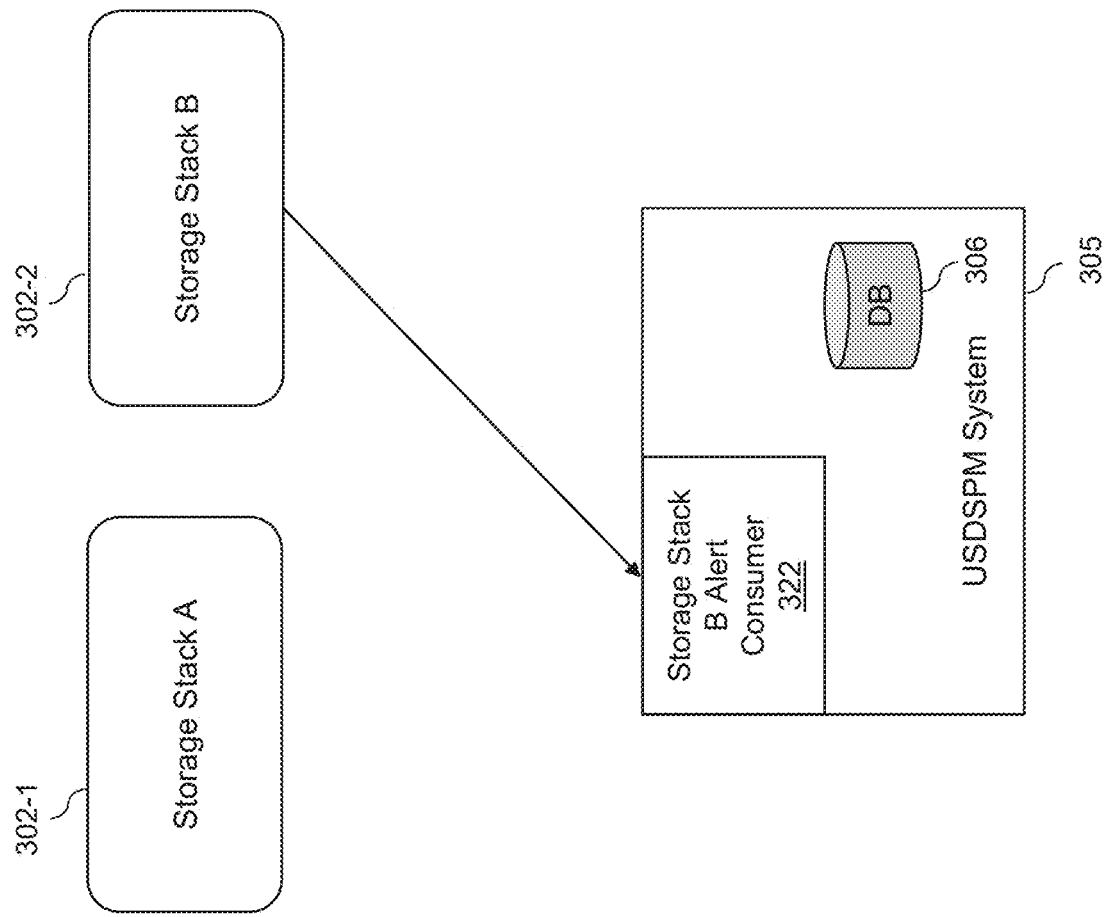
FIG. 4 shows storage stack alert consumption in an illustrative embodiment.

FIG. 4 shows storage stack alert consumption in an illustrative embodiment. By way of illustration, FIG. 4 depicts an alert published by storage stack B 302-2 and consumed by storage stack B alert consumer 322 (which is embodied within USDSPM system 305). In at least one embodiment, an alert consumer is required for each software-defined storage stack that is under management by the USDSPM system. Monitoring and alerting can be implemented differently across storage stacks, and as such, in one or more embodiments, each storage stack will have a one-to-one mapping with a storage stack alert consumer. Each such storage stack consumer will implement the specific logic required to capture and receive alerts from the corresponding software-defined storage stack. Also, in at least one embodiment, an example software-defined storage stack alert can include one or more of the following fields: alert type (i.e., a type identifier extracted from the alert from the storage stack (e.g., DEVICE_ERROR)); severity (i.e., a severity level associated with the alert); affected object (i.e., the affected object(s) from the storage stack that is/are directly associated with the source alert); start time (i.e., the time of the alert originating from the storage stack); universally unique identifier (UUID); and links (i.e., information that links back to the software-defined storage stack where the alert originated).

Figure 5:
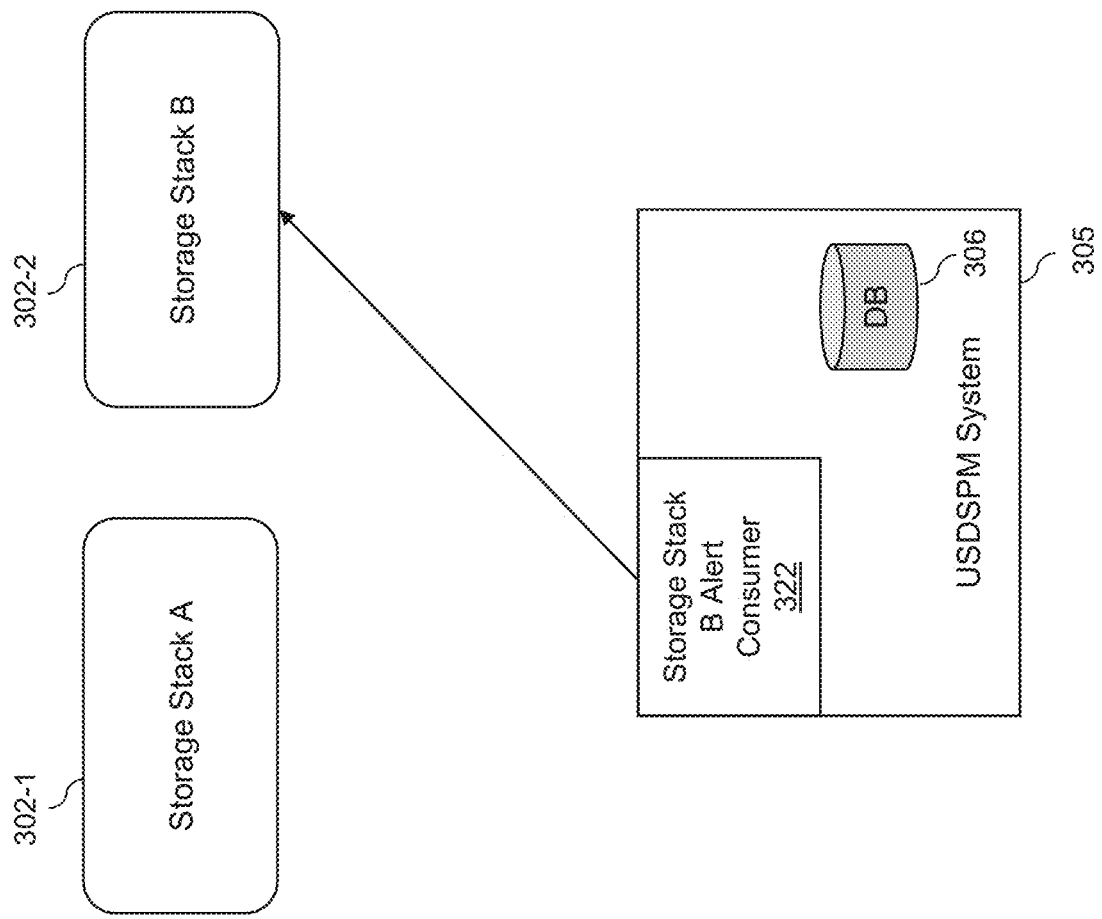
FIG. 5 shows an example alert augmentation in an illustrative embodiment.

FIG. 5 shows an example alert augmentation in an illustrative embodiment. By way of illustration, FIG. 5 depicts storage stack B alert consumer 322 communicating with storage stack B 302-2 to obtain additional information related to the alert. For example, as detailed herein, when an alert is captured, one or more embodiments include augmenting the alert with additional information related to one or more affected resources. In such an embodiment, if the storage stack alert contains minimal and/or abstract information regarding one or more affected resources, the storage stack alert consumer will communicate with the storage stack to obtain additional information (e.g., more specific and/or concrete information). For example, consider a use case wherein the alert consumer consumes a disk error alert, wherein the alert only contains a key linking back to an internal disk object known only by the storage stack. In such an example embodiment, the alert consumer will query the storage stack to obtain one or more additional details about the disk and/or other impacted resources such as, for instance, the disk path, the disk media type, one or more software-defined storage nodes (e.g., servers) associated with the disk, the storage pool associated with the disk, volumes associated with the impacted storage pool, etc.

Using such additional information, at least one embodiment includes augmenting the alert to generate and/or provide a more complete view of the affected resource(s) and/or one or more dependent resources.

Additionally, in one or more embodiments, after the storage stack augmentation is completed, the alert can be transformed into an augmented storage stack alert (e.g., by storage stack B alert consumer 322) that can be consumed by one or more interested parties within the USDSPM system. In at least one embodiment, this action can represent an intermediate step that produces a generic, fully augmented source storage stack alert. In such an embodiment, this augmented alert contains no information pertaining to dependencies between software-defined storage stacks (as further detailed herein). Accordingly, in at least one embodiment, an example augmented software-defined storage stack alert can include one or more of the following fields: alert type (i.e., a type identifier extracted from the alert from the storage stack (e.g., DEVICE_ERROR)); storage stack (i.e., the USDSPM's internal identifier linking the alert to a software-defined storage stack (e.g., the stack from which the alert originated)); severity (i.e., a severity level associated with the alert); affected object (i.e., the affected object (s) from the storage stack that is/are directly associated with the source alert); impacted resources (i.e., identification of other impacted resources within the storage stack (e.g., servers, storage pools, volumes, etc.)); timestamp (i.e., the date and time of the alert originating from the storage stack); and metadata (i.e., additional information that links back to the software-defined storage stack where the alert originated).

Once the augmented alert is constructed, at least one embodiment includes publishing and/or sending the augmented alert to one or more interested parties within the USDSPM system. Examples of interested parties can include information technology (IT) administrators, IT operations managers, etc.

Figure 6:
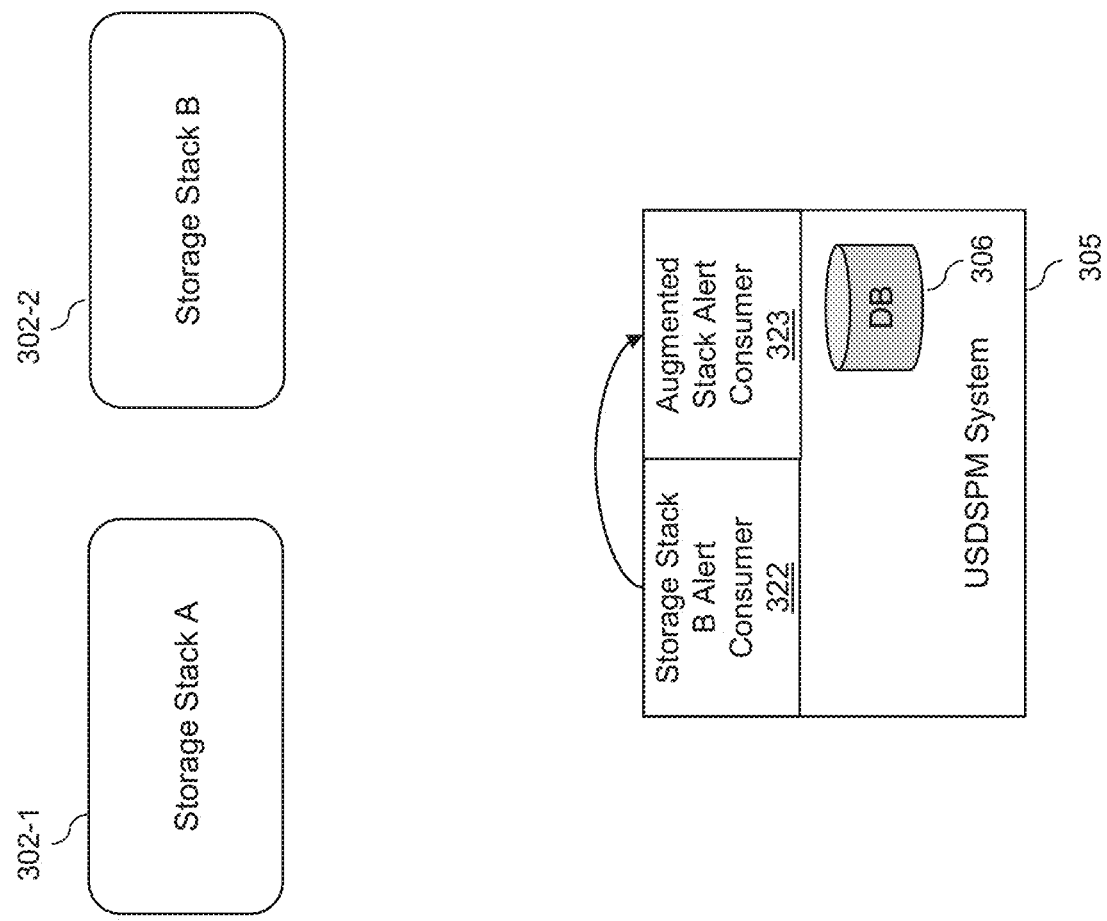
FIG. 6 shows augmented storage stack alert consumption in an illustrative embodiment.

FIG. 6 shows augmented storage stack alert consumption in an illustrative embodiment. By way of illustration, FIG. 6 depicts augmented stack alert consumer 323 consuming the augmented software-defined storage stack alert (generated and/or published by storage stack B alert consumer 322) for the subsequent incorporation of storage stack dependency information (such as detailed, for example, in connection with FIG. 7). Accordingly, as further detailed below, the resulting alert can contain a context of impacted resources and the dependent software-defined storage stacks.

Figure 7:
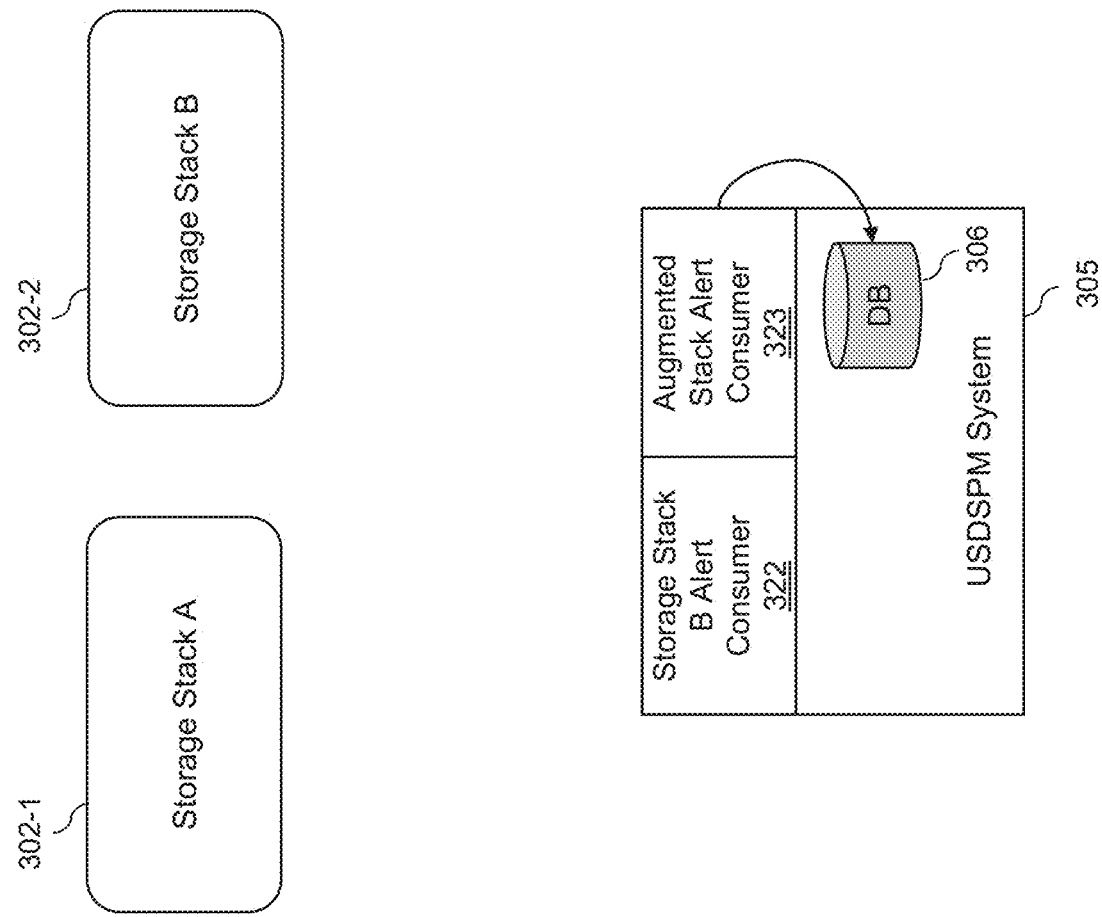
FIG. 7 shows obtaining storage stack dependency information in an illustrative embodiment.

FIG. 7 shows obtaining storage stack dependency information in an illustrative embodiment. By way of illustration, FIG. 7 depicts the augmented stack alert consumer 323 obtaining storage stack dependency information from the USDSPM system 305 (e.g., from database 306). As such, during deployment, the USDSPM system can persist determined and/or identified interdependencies between any layered software-defined storage deployments. Therefore, at least one embodiment includes communicating with the appropriate interface(s) in the USDSPM system to query for dependent software-defined storage stacks. When the additional dependency information has been obtained, the corresponding augmented alert is transformed into a generic USDSPM alert (such as detailed, for example, in connection with FIG. 8) and can be published for one or more interested parties to consume. Potential consumers of the generic USDSPM alerts can provide notifications to administrators and/or facilitate automatic remediation of one or more issues related to the alerts.

Figure 8:
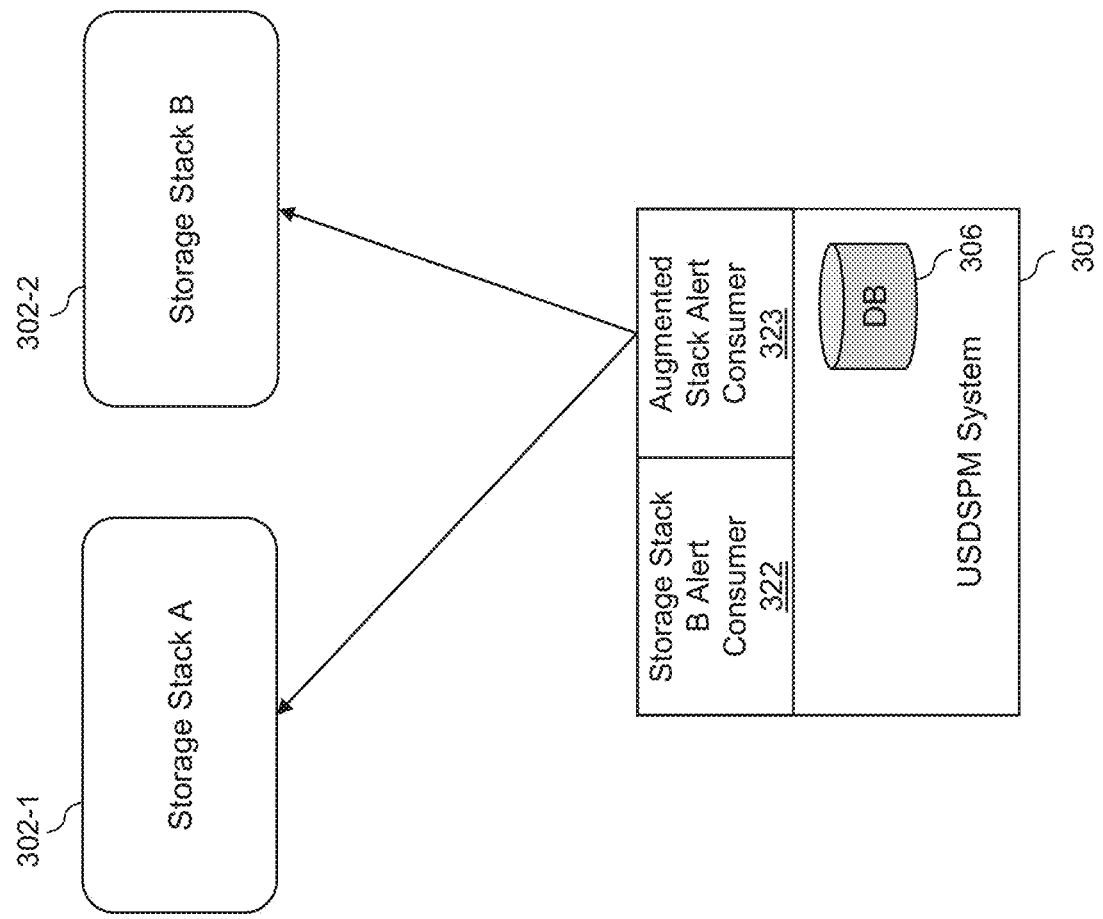
FIG. 8 shows creating a generic alert with stack dependencies in an illustrative embodiment.

As noted above, FIG. 8 shows creating a generic alert with stack dependencies in an illustrative embodiment. By way of illustration, FIG. 8 depicts the augmented stack alert consumer 323 creating a generic alert that is common and/or compatible across the USDSPM system 305, wherein the generic alert is augmented with storage stack dependency information (e.g., such as obtained in the example embodiment detailed in FIG. 7). As also depicted in FIG. 8, the augmented stack alert consumer 323 publishes the created generic alert to at least storage stack A 302-1 and storage stack B 302-2, such that other consumers can perform actions based thereon (e.g., actions such as notifications and remediation operations). In at least one embodiment, an example generic software-defined storage stack alert can include one or more of the following fields: alert type (e.g., DEVICE_ERROR); storage stack (e.g., the stack from which the alert originated, such as Storage Stack B); severity (i.e., a severity level associated with the alert); affected object (i.e., the affected object(s) from the storage stack that is directly associated with the source alert); impacted resources (e.g., servers, storage pools, volumes, etc.); dependent storage stack (e.g., Storage Stack A); native alert ID; timestamp (i.e., the date and time of the alert originating from the storage stack); and metadata (i.e., additional information that links back to the software-defined storage stack where the alert originated).

Figure 9:
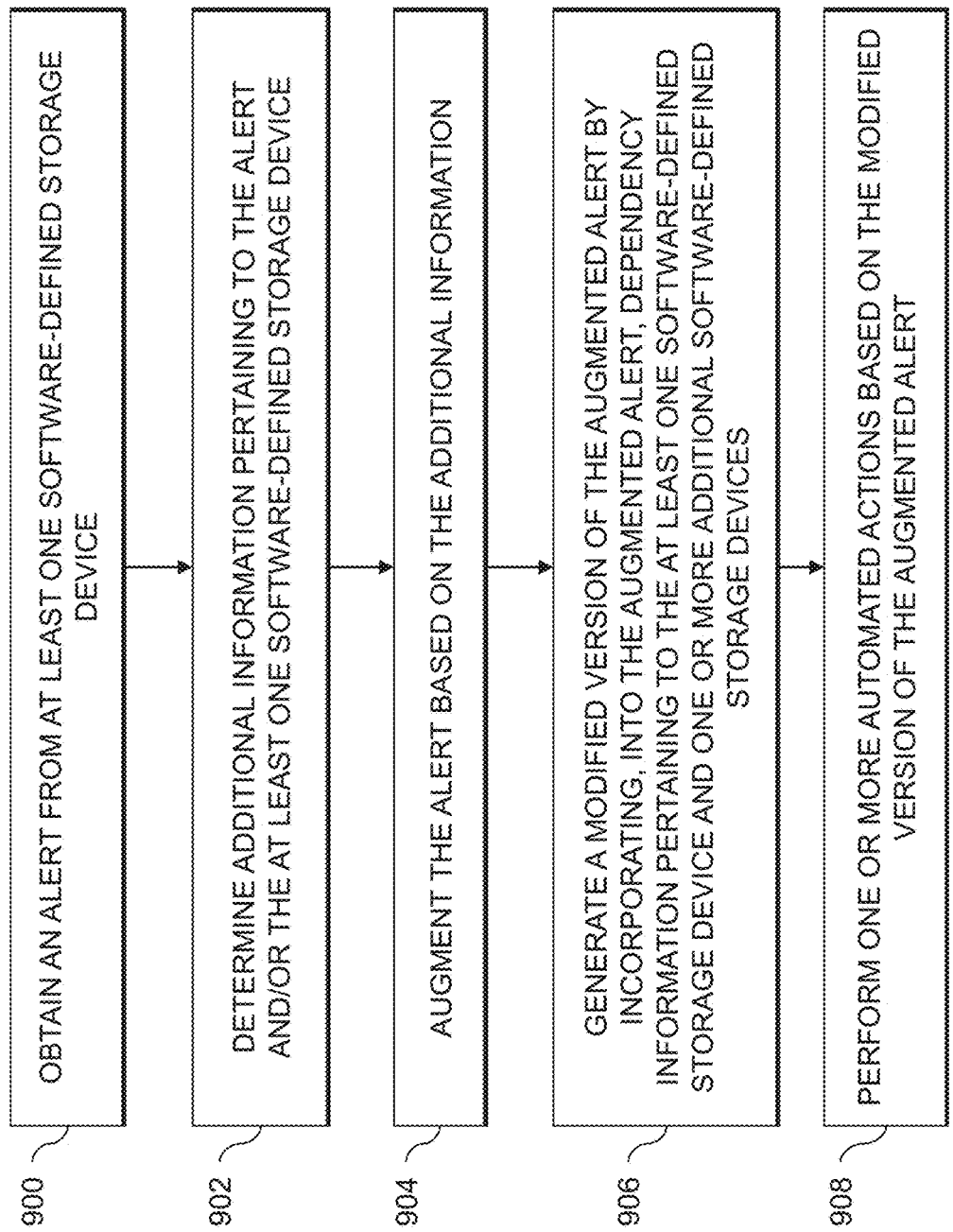
FIG. 9 is a flow diagram of a process for automated alert augmentation for deployments of software-defined storage in an illustrative embodiment.

FIG. 9 is a flow diagram of a process for automated alert augmentation for deployments of software-defined storage in an illustrative embodiment. It is to be understood that this particular process is only an example, and additional or alternative processes can be carried out in other embodiments.

In this embodiment, the process includes steps 900 through 908. These steps are assumed to be performed by the USDSPM system 105 utilizing its modules 112, 114 and 116.

Step 900 includes obtaining an alert from at least one software-defined storage device. In at least one embodiment, the at least one software-defined storage device includes at least one software-defined storage stack.

Step 902 includes determining one or more items of additional information pertaining to one or more of the alert and the at least one software-defined storage device. In at least one embodiment, determining the one or more items of additional information includes identifying one or more affected resources related to the alert, wherein the one or more affected resources comprise at least one of disk path, disk media type, one or more servers, one or more storage pools, and one or more volumes. Step 904 includes augmenting the alert based at least in part on the one or more determined items of additional information.

Step 906 includes generating a modified version of the augmented alert by incorporating, into the augmented alert, dependency information pertaining to the at least one software-defined storage device and one or more additional software-defined storage devices. In one or more embodiments, generating the modified version of the augmented alert includes configuring the augmented alert with one or more of the following fields: alert type, software-defined storage stack from which the alert originated, severity associated with the alert, one or more affected resources of a software-defined storage stack associated with the alert, one or more impacted resources, one or more dependent software-defined storage stacks, alert identifier, date and time of the alert, and one or more items of metadata.

Step 908 includes performing one or more automated actions based at least in part on the modified version of the augmented alert. In at least one embodiment, performing the one or more automated actions includes generating and outputting one or more notifications related to the modified version of the augmented alert. Additionally or alternatively, performing the one or more automated actions can include executing at least one remediation action in response to the modified version of the augmented alert.

The techniques depicted in FIG. 9 can also include publishing the modified version of the augmented alert to one or more storage-related entities and/or publishing the augmented alert to one or more storage-related entities.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate modified software-defined storage stack alerts using dependency information and additional storage-related data. These and other embodiments can effectively overcome problems associated with uncertainty arising from insufficient context provided in conventional storage-related alerts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
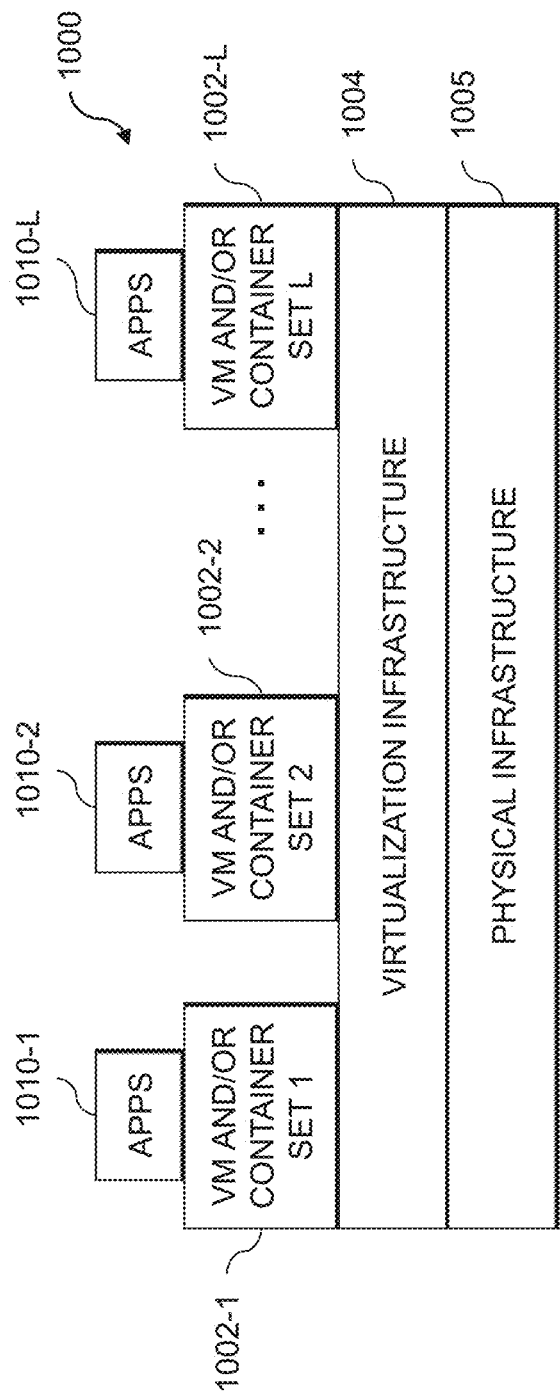
FIGS. 10 and 11 show examples of processing platforms that may be utilized to implement at least a portion of an information processing system in illustrative embodiments.
Figure 11:
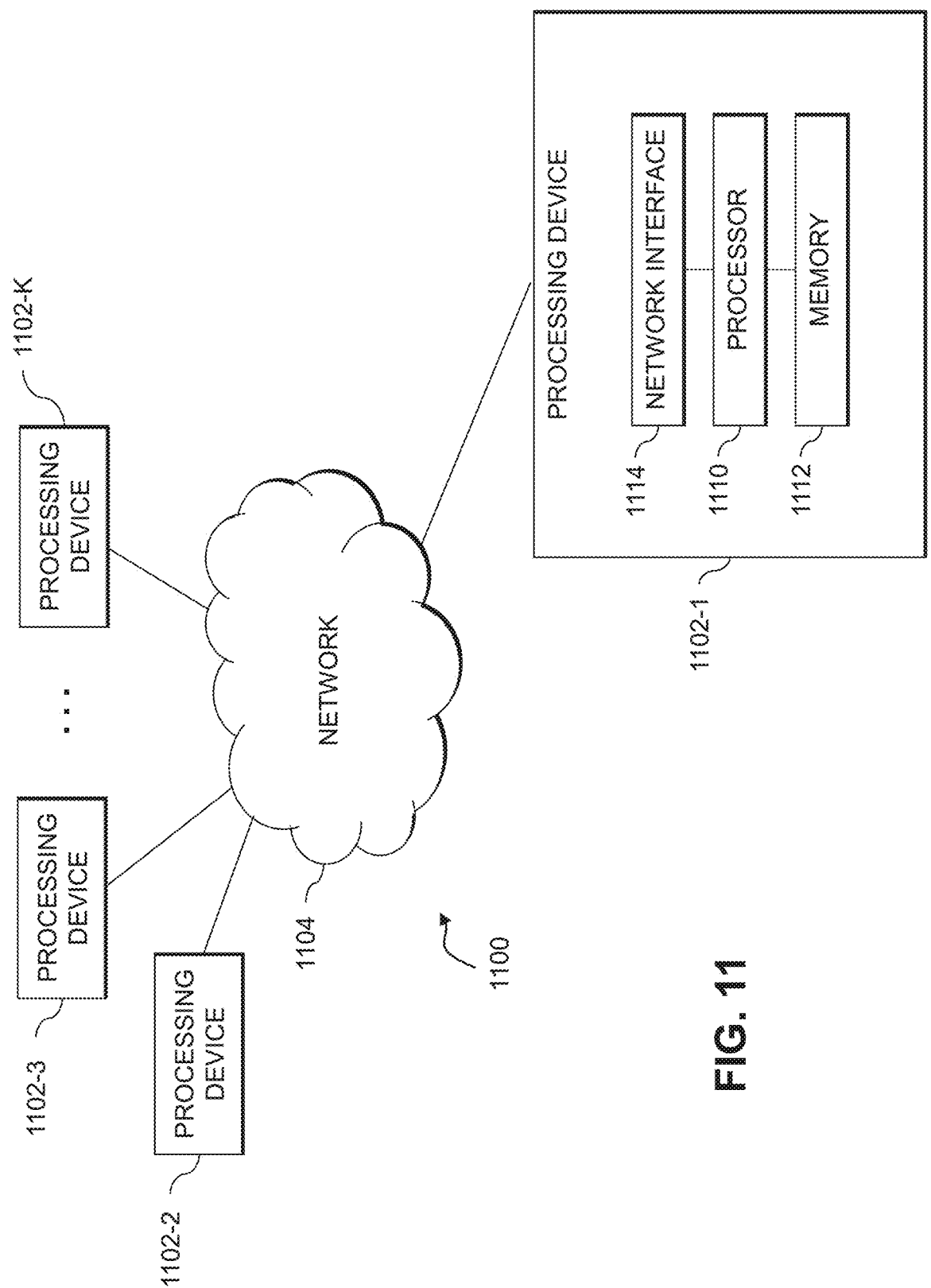

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a microcontroller, an application-specific integrated circuit (ASIC), a field-programmable gate array (FPGA) or other type of processing circuitry, as well as portions or combinations of such circuitry elements.

The memory 1112 comprises random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, storage systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining an alert from at least one software-defined storage device, wherein the at least one software-defined storage device comprises at least one software-defined storage stack, and wherein obtaining the alert comprises implementing at least one mapped consumer component having a one-to-one mapping to the at least one software-defined storage stack;
    determining, via communicating with the at least one software-defined storage device using the at least one mapped consumer component, one or more items of additional information pertaining to one or more of the alert and the at least one software-defined storage device;
    augmenting the alert based at least in part on the one or more determined items of additional information;
    generating a modified version of the augmented alert by incorporating, into the augmented alert, dependency information pertaining to the at least one software-defined storage device and one or more additional software-defined storage devices; and
    performing one or more automated actions based at least in part on the modified version of the augmented alert;
    wherein the method is performed by at least one processing device comprising a processor coupled to a memory.

2. The computer-implemented method of claim 1, wherein determining the one or more items of additional information comprises identifying one or more affected resources related to the alert, wherein the one or more affected resources comprise at least one of disk path, disk media type, one or more servers, one or more storage pools, and one or more volumes.

3. The computer-implemented method of claim 1, wherein performing the one or more automated actions comprises generating and outputting one or more notifications related to the modified version of the augmented alert.

4. The computer-implemented method of claim 1, wherein performing the one or more automated actions comprises executing at least one remediation action in response to the modified version of the augmented alert.

5. The computer-implemented method of claim 1, wherein generating the modified version of the augmented alert comprises configuring the augmented alert with one or more of the following fields: alert type, software-defined storage stack from which the alert originated, severity associated with the alert, one or more affected resources of a software-defined storage stack associated with the alert, one or more impacted resources, one or more dependent software-defined storage stacks, alert identifier, date and time of the alert, and one or more items of metadata.

6. The computer-implemented method of claim 1, further comprising:
publishing the modified version of the augmented alert to one or more storage-related entities.

7. The computer-implemented method of claim 1, further comprising:
publishing the augmented alert to one or more storage-related entities.

8. A non-transitory processor-readable storage medium having stored therein program code of one or more software programs, wherein the program code when executed by at least one processing device causes the at least one processing device:
to obtain an alert from at least one software-defined storage device, wherein the at least one software-defined storage device comprises at least one software-defined storage stack, and wherein obtaining the alert comprises implementing at least one mapped consumer component having a one-to-one mapping to the at least one software-defined storage stack;
to determine, via communicating with the at least one software-defined storage device using the at least one mapped consumer component, one or more items of additional information pertaining to one or more of the alert and the at least one software-defined storage device;
to augment the alert based at least in part on the one or more determined items of additional information; to generate a modified version of the augmented alert by incorporating, into the augmented alert, dependency information pertaining to the at least one software-defined storage device and one or more additional software-defined storage devices; and
to perform one or more automated actions based at least in part on the modified version of the augmented alert.

9. The non-transitory processor-readable storage medium of claim 8, wherein determining the one or more items of additional information comprises identifying one or more affected resources related to the alert, wherein the one or more affected resources comprise at least one of disk path, disk media type, one or more servers, one or more storage pools, and one or more volumes.

10. The non-transitory processor-readable storage medium of claim 8, wherein performing the one or more automated actions comprises generating and outputting one or more notifications related to the modified version of the augmented alert.

11. The non-transitory processor-readable storage medium of claim 8, wherein performing the one or more automated actions comprises executing at least one remediation action in response to the modified version of the augmented alert.

12. The non-transitory processor-readable storage medium of claim 8, wherein generating the modified version of the augmented alert comprises configuring the augmented alert with one or more of the following fields: alert type, software-defined storage stack from which the alert originated, severity associated with the alert, one or more affected resources of a software-defined storage stack associated with the alert, one or more impacted resources, one or more dependent software-defined storage stacks, alert identifier, date and time of the alert, and one or more items of metadata.

13. The non-transitory processor-readable storage medium of claim 8, wherein the program code when executed by the at least one processing device causes the at least one processing device:
to publish the modified version of the augmented alert to one or more storage-related entities.

14. An apparatus comprising:
at least one processing device comprising a processor coupled to a memory;
the at least one processing device being configured:
to obtain an alert from at least one software-defined storage device, wherein the at least one software-defined storage device comprises at least one software-defined storage stack, and wherein obtaining the alert comprises implementing at least one mapped consumer component having a one-to-one mapping to the at least one software-defined storage stack;
to determine, via communicating with the at least one software-defined storage device using the at least one mapped consumer component, one or more items of additional information pertaining to one or more of the alert and the at least one software-defined storage device;
to augment the alert based at least in part on the one or more determined items of additional information;
to generate a modified version of the augmented alert by incorporating, into the augmented alert, dependency information pertaining to the at least one software-defined storage device and one or more additional software-defined storage devices; and
to perform one or more automated actions based at least in part on the modified version of the augmented alert.

15. The apparatus of claim 14, wherein determining the one or more items of additional information comprises identifying one or more affected resources related to the alert, wherein the one or more affected resources comprise at least one of disk path, disk media type, one or more servers, one or more storage pools, and one or more volumes.

16. The apparatus of claim 14, wherein performing the one or more automated actions comprises generating and outputting one or more notifications related to the modified version of the augmented alert.

17. The apparatus of claim 14, wherein performing the one or more automated actions comprises executing at least one remediation action in response to the modified version of the augmented alert.

18. The apparatus of claim 14, wherein generating the modified version of the augmented alert comprises configuring the augmented alert with one or more of the following fields: alert type, software-defined storage stack from which the alert originated, severity associated with the alert, one or more affected resources of a software-defined storage stack associated with the alert, one or more impacted resources, one or more dependent software-defined storage stacks, alert identifier, date and time of the alert, and one or more items of metadata.

19. The apparatus of claim 14, the at least one processing device being further configured:
to publish the modified version of the augmented alert to one or more storage-related entities.

* * * * *